United States Patent
Mahiko et al.

(10) Patent No.: US 12,403,437 B2
(45) Date of Patent: Sep. 2, 2025

(54) METHOD FOR PRODUCING NANODIAMONDS DOPED WITH GROUP 14 ELEMENT, AND METHOD FOR PURIFYING SAME

(71) Applicant: DAICEL CORPORATION, Osaka (JP)

(72) Inventors: Tomoaki Mahiko, Tokyo (JP); Yuto Makino, Tokyo (JP); Akihiko Tsurui, Tokyo (JP); Ming Liu, Tokyo (JP); Masahiro Nishikawa, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 1011 days.

(21) Appl. No.: 17/598,110

(22) PCT Filed: Mar. 16, 2020

(86) PCT No.: PCT/JP2020/011340
§ 371 (c)(1),
(2) Date: Mar. 18, 2022

(87) PCT Pub. No.: WO2020/195999
PCT Pub. Date: Oct. 1, 2020

(65) Prior Publication Data
US 2022/0331766 A1   Oct. 20, 2022

(30) Foreign Application Priority Data

Mar. 26, 2019 (JP) ................................ 2019-058397
Nov. 26, 2019 (JP) ................................ 2019-212822

(51) Int. Cl.
*B01J 3/08* (2006.01)
*B01J 3/06* (2006.01)
(Continued)

(52) U.S. Cl.
CPC ............... *B01J 3/08* (2013.01); *B01J 3/062* (2013.01); *C01B 32/15* (2017.08); *C01B 32/28* (2017.08);
(Continued)

(58) Field of Classification Search
CPC ...... B01J 3/08; B01J 3/062; B01J 2203/0655; B01J 2203/062; B01J 2203/0695;
(Continued)

(56) References Cited

U.S. PATENT DOCUMENTS

2005/0086870 A1   4/2005   Kumasaka
2009/0220556 A1   9/2009   Shenderova et al.
(Continued)

FOREIGN PATENT DOCUMENTS

CN    1982984 A        5/2007
CN    104624358    *  11/2013  ............... B03B 7/00
(Continued)

OTHER PUBLICATIONS

Mitev, et al., Direct sector field ICP-MS determination of metal impurities in detonation nanodiamond, Carbon 2013; 60: 326-334 (Year: 2013).*
(Continued)

*Primary Examiner* — Daniel C. McCracken
(74) *Attorney, Agent, or Firm* — Birch, Stewart, Kolasch & Birch, LLP (57) ABSTRACT

The present invention is to provide a method for producing nanodiamonds doped with a Group 14 element, the method comprising: detonating by exploding an explosive composition containing at least one explosive and at least one Group 14 element compound in a sealed container to obtain nanodiamonds doped with at least one Group 14 element selected from the group consisting of Si, Ge, Sn, and Pb, and removing the Group 14 element and/or oxide thereof by (Continued)

subjecting the nanodiamonds doped with a Group 14 element to an alkali treatment.

14 Claims, 2 Drawing Sheets

(51) Int. Cl.
    *B82Y 30/00*     (2011.01)
    *B82Y 40/00*     (2011.01)
    *C01B 32/15*     (2017.01)
    *C01B 32/28*     (2017.01)

(52) U.S. Cl.
    CPC ........ *B01J 2203/0655* (2013.01); *B82Y 30/00* (2013.01); *B82Y 40/00* (2013.01); *C01P 2004/64* (2013.01)

(58) Field of Classification Search
    CPC .... B01J 3/06; B01J 3/065; B01J 3/067; C01B 32/15; C01B 32/28; C01B 32/26; C01B 32/25; B82Y 30/00; B82Y 40/00; B82Y 20/00; C01P 2004/64; C01P 2002/52; C01P 2006/80; C23C 16/26; C23C 16/27; C23C 16/271; C23C 16/272; C23C 16/274; C23C 16/275; C23C 16/276; C23C 16/277; C23C 16/278; C23C 16/279; C23C 14/06; C23C 14/0605; C23C 14/0611

See application file for complete search history.

(56) References Cited

U.S. PATENT DOCUMENTS

| | | |
|---|---|---|
| 2010/0254884 A1 | 10/2010 | Shenderova |
| 2015/0050207 A1 | 2/2015 | Dolmatov et al. |
| 2015/0157997 A1 | 6/2015 | Spitzer et al. |
| 2017/0313590 A1* | 11/2017 | Kimoto .................... H01B 1/04 |

FOREIGN PATENT DOCUMENTS

| | | |
|---|---|---|
| CN | 104624358 A | 5/2015 |
| DE | 199 33 648 A1 | 1/2001 |
| JP | 2004-176132 A | 6/2004 |
| JP | 2005-131711 A | 5/2005 |
| JP | 2014-504254 A | 2/2014 |
| JP | 2015-509904 A | 4/2015 |
| JP | 2016-60681 A | 4/2016 |
| WO | WO 2012/084656 A1 | 6/2012 |
| WO | WO 2018/072137 A1 | 5/2016 |
| WO | WO 2017/141889 A1 | 8/2017 |

OTHER PUBLICATIONS

Bogranov et al., "Desorption of impurities during heating of detonation nanodiamond," Letters to ZhTF, vol. 38, No. 4, 2012, 14 pages total, with English translation.
Plotnikov et al., "The structure of detonation nanodiamond particles," AIP Conference Proceedings, vol. 1785, No. 040045, 2016, 5 pages total.
Bradac et al., "Observation and control of blinking nitrogen-vacancy centres in discrete nanodiamonds," Nature Nanotechnology (2010), vol. 5, No. 5, pp. 345-349.
Dolmatov et al., "A Study of Defects and Impurities in Doped Detonation Nanodiamonds by EPR, Raman Scattering, and XRD Methods", Journal of Superhard Materials (2016), vol. 38, No. 4, pp. 219-229.
Duffy et al., "Assessing the extent, stability, purity and properties of silanised detonation nanodiamond," Applied Surface Science (2015), vol. 357, Part A, pp. 397-406.
Catledge et al., "Strong Narrow-Band Luminescence from Silicon-Vacancy Color Centers in Spatially Localized Sub-10 nm Nanodiamond", Advanced Science Letters, vol. 4, 2011, pp. 512-515.
Duffy et al., "Assessing the extent, stability, purity and properties of silanised detonation nanodiamond", Applied Surface Science, vol. 357, Sep. 2, 2015, pp. 397-406.
International Preliminary Report on Patentability and Written Opinion of the International Searching Authority for International Application No. PCT/JP2020/011340, dated Sep. 28, 2021, with English translation.
International Search Report for International Application No. PCT/JP2020/011340, dated Jun. 9, 2020, with an English translation.
Neu et al., "Narrowband fluorescent nanodiamonds produced from chemical vapor deposition films", Applied Physics Letters, vol. 96, published online Jun. 13, 2011, pp. 1-3.
Tegetmeyer et al., "Incorporation of SiV-centers in diamond nanoparticles using silicon background doping", Diamond & Related Materials, vol. 65, 2016, pp. 87-90.
Vlasov et al., "Molecular-sized fluorescent nanodiamonds", Nature Nanotechnology, vol. 9, published online Dec. 8, 2013, pp. 54-58.

\* cited by examiner

METHOD FOR PRODUCING NANODIAMONDS DOPED WITH GROUP 14 ELEMENT, AND METHOD FOR PURIFYING SAME

TECHNICAL FIELD

The present invention relates to a method for producing nanodiamonds doped with a Group 14 element and a method for purifying the same.

BACKGROUND ART

A luminescent center in diamond is a nanosized chemically stable fluorescent chromophore and does not exhibit degradation, fading, or flickering in vivo, which often occur in organic fluorescent, and thus is expected as probes for fluorescence imaging. In addition, information on spins of electrons excited in the luminescent center can be sometimes measured from outside, and thus the luminescent center is also expected to be utilized in optically detected magnetic resonance (ODMR) or as a quantum bit.

The Si—V center, which is a type of luminescent center of diamond, has a sharp peak called zero phonon level (ZPL) in an emission spectrum (Non-Patent Literature 1).

Diamonds doped with silicon are produced by CVD, for example (Patent Documents 1 and 2).

In Non-Patent Literature 2, nanodiamonds in a meteorite are analyzed; however, nanodiamonds having the silicon-vacancy (SiV) center are not produced. Non-Patent Literature 2 describes that the Si—V center in nanodiamond from 1.1 nm to 1.8 nm is thermodynamically stable according to simulation.

FIG. 1 of Non-Patent Literature 3 shows nanodiamonds having the Si—V center adjusted by CVD according AFM. In a graph at the upper right part of FIG. 1, the vertical axis represents the height (nm) and the horizontal axis represents the position (μ), and it is clear that the peak height thereof is approximately 9 nm, and the width (position) is at least 70 nm.

Non-Patent Literature 4 describes, by using nanodiamonds of 3 to 4 nm as a seed solution and allowing growth on a silicon wafer by MWPE-CVD, nanodiamonds having an average particle diameter of 73 nm and having the SiV center can be obtained.

CITATION LIST

Patent Document

Patent Document 1: JP 2014-504254 T
Patent Document 2: JP 2004-176132 A

Non-Patent Literature

Non-Patent Literature 1: E. Neu et al. APPLIED PHYSICS LETTERS 98, 243107 (2011)
Non-Patent Literature 2: Nat Nanotechnol. 2014 January; 9(1): 54-8. doi: 10.1038/nnano 2013.255. Epub 2013 Dec. 8.
Non-Patent Literature 3: Adv Sci Lett. 2011 Feb. 1; 4(2): 512-515.
Non-Patent Literature 4: Diamond and Related Materials, Volume 65, 2016, Pages 87-90

SUMMARY OF INVENTION

Technical Problem

An object of the present invention is to provide a method for producing nanodiamonds doped with a Group 14 element, such as silicon (Si), germanium (Ge), and tin (Sn), and a method for purifying the same.

Solution to Problem

The present invention is to provide a method for producing nanodiamonds doped with a Group 14 element and a method for purifying the same, as described below.

Item 1. A method for producing a nanodiamond doped with a Group 14 element, the method comprising:
  detonating by exploding an explosive composition containing at least one explosive and at least one Group 14 element compound in a sealed container to obtain a nanodiamond doped with at least one Group 14 element selected from the group consisting of Si, Ge, Sn, and Pb, and
  subjecting the nanodiamond doped with the Group 14 element to an alkali treatment to remove the Group 14 element and/or oxide thereof.

Item 2. The method for producing a nanodiamond doped with a Group 14 element according to Item 1, further comprising treating the nanodiamond doped with the Group 14 element with a mixed acid of concentrated nitric acid and concentrated sulfuric acid before or after the alkali treatment.

Item 3. The method for producing a nanodiamond doped with a Group 14 element according to Item 1 or 2, where the explosive composition further comprises a compound comprising at least one third element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids.

Item 4. A method for purifying a nanodiamond doped with a Group 14 element, the method comprising:
  subjecting a nanodiamond composition containing at least one Group 14 element selected from the group consisting of Si, Ge, Sn, and Pb and/or oxide thereof and a nanodiamond doped with the Group 14 element to an alkali treatment to remove the Group 14 element and/or oxide thereof.

Item 5. The method for purifying a nanodiamond doped with a Group 14 element according to Item 4, where the nanodiamond composition is obtained by mixed acid treatment.

Item 6. The method for purifying a nanodiamond doped with a Group 14 element according to Item 4 or 5, where the nanodiamond composition further comprises at least one third element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids, and/or oxide thereof.

Item 7. The method for purifying a nanodiamond doped with a Group 14 element according to any one of Items 4 to 6, wherein the nanodiamond is further doped with at least one third element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids.

Advantageous Effects of Invention

Although at least one Group 14 element selected from the group consisting of Si, Ge, Sn, and Pb and oxide thereof cannot be easily removed by a mixed acid treatment, these can be removed from the nanodiamonds doped with a Group 14 element by an alkali treatment.

BRIEF DESCRIPTION OF DRAWINGS

FIG. 1(b) is a fluorescence spectrum of the brightness.

DESCRIPTION OF EMBODIMENTS

The nanodiamond according to an embodiment of the present invention may be further doped with another element besides the Group 14 element. Examples of such an element include at least one element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids (hereinafter, also referred to as "third element"). When the nanodiamond is doped with the third element, the explosive composition contains at least one explosive, at least one Group 14 element compound, and further at least one third element compound.

In the present specification, nanodiamond doped with the Group 14 element and, as necessary, the third element may be simply referred to as "doped nanodiamond".

In an embodiment of the present invention, the production method according to an embodiment of the present invention includes detonating by exploding an explosive composition containing at least one explosive and at least one Group 14 element compound and, as necessary, at least one third element compound in a sealed container to obtain nanodiamonds doped with a Group 14 element and, as necessary, a third element, and subjecting the nanodiamonds doped with the Group 14 element and, as necessary, the third element to an alkali treatment to remove the Group 14 element and/or oxide thereof.

The Group 14 element to be used for doping of nanodiamonds is at least one selected from the group consisting of Si, Ge, Sn, and Pb and is preferably Si.

The explosive is not particularly limited, and known explosives can be widely used. Specific examples thereof include trinitrotoluene (TNT), cyclotrimethylene trinitramine (hexogen, RDX), cyclotetramethylene tetranitramine (octogen), trinitrophenyl methylnitramine (tetryl), pentaerythritol tetranitrate (PETN), tetranitromethane (TNM), triamino-trinitrobenzene, hexanitrostilbene, and diaminodinitrobenzofuroxan. These explosives can be used singly, or in a combination of two or more.

The Group 14 element compound contains at least one selected from the group consisting of silicon compounds, germanium compounds, tin compounds, and lead compounds.

Examples of the organic silicon compound include the following:

silane having a lower alkyl group, such as acetoxytrimethylsilane, diacetoxydimethylsilane, triacetoxymethylsilane, acetoxytriethylsilane, diacetoxydiethylsilane, triacetoxyethylsilane, acetoxytripropylsilane, methoxytrimethylsilane, dimethoxydimethylsilane, trimethoxymethylsilane, ethoxytrimethylsilane, diethoxydimethylsilane, triethoxymethylsilane, ethoxytriethylsilane, diethoxydiethylsilane, triethoxyethylsilane, and trimethylphenoxysilane;

silane having a halogen atom, such as trichloromethylsilane, dichlorodimethylsilane, chlorotrimethylsilane, trichloroethylsilane, dichlorodiethylsilane, chlorotriethylsilane, trichlorophenylsilane, dichlorodiphenylsilane, chlorotriphenylsilane, dichlorodiphenylsilane, dichloromethylphenylsilane, dichloroethylphenylsilane, chlorodifluoromethylsilane, dichlorofluoromethylsilane, chlorofluorodimethylsilane, chloroethyldifluorosilane, dichloroethylfluorosilane, chlorodifluoropropylsilane, dichlorofluoropropylsilane, trifluoromethylsilane, difluorodimethylsilane, fluorotrimethylsilane, ethyltrifluorosilane, diethyldifluorosilane, triethylfluorosilane, trifluoropropylsilane, fluorotripropylsilane, trifluorophenylsilane, difluorodiphenylsilane, fluorotriphenylsilane, tribromomethylsilane, dibromodimethylsilane, bromotrimethylsilane, bromotriethylsilane, bromotripropylsilane, dibromodiphenylsilane, and bromotriphenylsilane;

polysilane, such as hexamethyldisilane, hexaethyldisilane, hexapropyldisilane, hexaphenyldisilane, and octaphenylcyclotetrasilane;

silazane, such as triethylsilazane, tripropylsilazane, triphenylsilazane, hexamethyldisilazane, hexaethyldisilazane, hexaphenyldisilazane, hexamethylcyclotrisilazane, octamethylcyclotetrasilazane, hexaethylcyclotrisilazane, octaethylcyclotetrasilazane, and hexaphenylcyclotrisilazane;

aromatic silane in which a silicon atom is incorporated in an aromatic ring, such as silabenzene and disilabenzene;

hydroxy group-containing silane, such as trimethylsilanol, dimethylphenylsilanol, triethylsilanol, diethylsilanediol, tripropylsilanol, dipropylsilanediol, triphenylsilanol, and diphenylsilanediol;

alkyl- or aryl-substituted silane, such as tetramethylsilane, ethyltrimethylsilane, trimethylpropylsilane, trimethylphenylsilane, diethyldimethylsilane, triethylmethylsilane, methyltriphenylsilane, tetraethylsilane, triethylphenylsilane, diethyldiphenylsilane, ethyltriphenylsilane, and tetraphenylsilane;

carboxyl group-containing silane, such as triphenylsilylcarboxylic acid, trimethylsilyl acetic acid, trimethylsilylpropionic acid, and trimethylsilylbutyric acid;

siloxane, such as hexamethyldisiloxane, hexaethyldisiloxane, hexapropyldisiloxane, and hexaphenyldisiloxane;

silane having an alkyl group or an aryl group and a hydrogen atom, such as methylsilane, dimethylsilane, trimethylsilane, diethylsilane, triethylsilane, tripropylsilane, diphenylsilane, and triphenylsilane; and tetrakis(chloromethyl)silane, tetrakis(hydroxymethyl)silane, tetrakis(trimethylsilyl)silane, tetrakis(trimethylsilyl)methane, tetrakis(dimethylsilanolyl)silane, tetrakis (tri(hydroxymethyl)silyl)silane, and tetrakis (nitratemethyl)silane.

Examples of the inorganic silicon compound include silicon oxide, silicon oxynitride, silicon nitride, silicon oxycarbide, silicon nitrocarbide, silane, and carbon materials doped with silicon. Examples of the carbon material doped with silicon include black lead, graphite, active carbon, carbon black, ketjen black, coke, soft carbon, hard carbon, acetylene black, carbon fibers, and mesoporous carbon.

A single organic or inorganic silicon compound may be used alone, or two or more organic or inorganic silicone compounds may be used in combination.

Examples of the germanium compound include organic germanium compounds, such as methylgermane, ethylgermane, trimethylgermanium methoxide, dimethylgermanium diacetate, tributylgermanium acetate, tetramethoxygermanium, tetraethoxygermanium, isobutylgermane, alkylgermanium trichloride, and dimethylaminogermanium trichloride, germanium complexes, such as nitrotriphenol complex ($Ge_2(ntp)_2O$), catechol complex ($Ge(cat)_2$) or aminopyrene complex ($Ge_2(ap)_2Cl_2$, and germanium alkoxide, such as germanium ethoxide and germanium tetrabutoxide.

A single germanium compound may be used alone, or two or more germanium compounds may be used in combination.

Examples of the tin compound include inorganic tin compounds, such as tin(II) oxide, tin(IV) oxide, tin(II) sulfide, tin(IV) sulfide, tin(II) chloride, tin(IV) chloride, tin(II) bromide, tin(II) fluoride, tin acetate, and tin sulfate, alkyl tin compounds, such as tetramethyltin, monoalkyltin oxide compounds, such as monobutyltin oxide, dialkyltin oxide compounds, such as dibutyltin oxide, aryltin compounds, such as tetraphenyltin, and organic tin compounds, such as dimethyltin maleate, hydroxybutyltin oxide, and monobutyltin tris(2-ethylhexanoate).

A signle tin compound may be used alone, or two or more tin compounds may be used in combination.

Examples of the lead compound include inorganic lead compounds, such as lead monoxide (PBO), lead dioxide ($PbO_2$), minium ($Pb_3O_4$), white lead ($2PbCO_3 \cdot Pb(OH)_2$), lead nitrate ($Pb(NO_3)_2$), lead chloride ($PbCl_2$), lead sulfide (PbS), chrome yellow ($PbCrO_4$, $Pb(SCr)O_4$, $PbO \cdot PbCrO_4$), lead carbonate ($PbCO_3$), lead sulfate ($PbSO_4$), lead fluoride ($PbF_2$), lead tetrafluoride ($PbF_4$), lead bromide ($PbBr_2$), and lead iodide ($PbI_2$), and organic lead compounds, such as lead acetate ($Pb(CH_3COO)_2$), lead tetracarboxylate ($Pb(OCOCH_3)_4$), tetraethyl lead ($Pb(CH_3CH_2)_4$), tetramethyl lead ($Pb(CH_3)_4$), and tetrabutyl lead ($Pb(C_4H_9)_4$).

A single lead compound may be used alone, or two or more flead compounds may be used in combination.

Examples of the third element compound include organic third element compounds and inorganic third element compounds, and one or a combination of two or more types of the third element compounds may be used.

The third element compound is exemplified below.

Examples of the boron compounds include inorganic boron compounds and organic boron compounds.

Examples of the inorganic boron compound include orthoboric acid, diboron dioxide, diboron trioxide, tetraboron trioxide, tetraboron pentoxide, boron tribromide, tetrafluoroboric acid, ammonium borate, and magnesium borate.

Examples of the organic boron compound include triethylborane, (R)-5,5-diphenyl-2-methyl-3,4-propano-1,3,2-oxazaborolidine, triisopropyl borate, 2-isopropoxy-4,4,5,5-tetramethyl-1,3,2-dioxaborolane, bis(hexylene glycolato) diboron, 4-(4,4,5,5-tetramethyl-1,3,2-dioxaborolan-2-yl)-1H-pyrazole, tert-butyl-N-[4-(4,4,5,5-tetramethyl-1,2,3-dioxaborolan-2-yl)phenyl]carbamate, phenylboronic acid, 3-acetylphenylboronic acid, boron trifluoride-acetic acid complex, boron trifluoride-sulfolane complex, 2-thiopheneboronic acid, and tris(trimethylsilyl) borate.

Examples of the phosphorus compounds include inorganic phosphorus compounds and organic phosphorus compounds. Examples of the inorganic phosphorus compound include ammonium polyphosphate.

Examples of the organic phosphorus compound include phosphates, such as trimethyl phosphate, triethyl phosphate, tripropyl phosphate, tributyl phosphate, tripentyl phosphate, trihexyl phosphate, dimethylethyl phosphate, methyldibutyl phosphate, ethyldipropyl phosphate, 2-ethylhexyldi(p-tolyl) phosphate, bis(2-ethylhexyl)p-tolyl phosphate, tritolylphosphate, di(dodecyl)p-tolyl phosphate, tris(2-butoxyethyl) phosphate, tricyclohexyl phosphate, triphenyl phosphate, ethyldiphenyl phosphate, dibutylphenyl phosphate, phenylbisdodecyl phosphate, cresyldiphenyl phosphate, tricresyl phosphate, p-tolylbis(2,5,5'-trimethylhexyl)phosphate, cresyl-2,6-xylenyl phosphate, trixylenyl phosphate, hydroxyphenyldiphenyl phosphate, tris(t-butylphenyl)phosphate, tris(i-propylphenyl)phosphate, 2-ethylhexyldiphenyl phosphate, bis(2-ethylhexyl)phenyl phosphate, tri(nonylphenyl) phosphate, and phenyl bisneopentyl phosphate;

condensed phosphates, such as 1,3-phenylene bis(diphenyl phosphate), 1,4-phenylene bis(dixylenyl phosphate), 1,3-phenylene bis(3,5,5'-trimethylhexyl phosphate), bisphenol A bis(diphenyl phosphate), 4,4'-biphenyl bis(dixylenyl phosphate), and 1,3,5-phenylene tris(dixylenyl phosphate), phosphites, such as trimethyl phosphite, triethyl phosphite, triphenyl phosphite, and tricresyl phosphite; and phosphites, such as 1,3-phenylene bis(diphenyl phosphite), 1,3-phenylene bis(dixylenyl phosphite), 1,4-phenylene bis(3,5,5'-trimethylhexyl phosphite), bisphenol A bis(diphenyl phosphite), 4,4'-biphenyl bis(dixylenyl phosphite), and 1,3,5-phenylene tris(dixylenyl phosphite).

Examples of the nickel compound include divalent nickel halides, such as nickel(II) chloride, nickel(II) bromide, and nickel(II) iodide, inorganic nickel compounds, such as nickel(II) acetate and nickel(II) carbonate, and organic nickel compounds, such as nickel bis(ethyl acetoacetate) and nickel bis(acetylacetonate).

Examples of the titanium compound include inorganic titanium compounds, such as titanium dioxide, titanium nitride, strontium titanate, lead titanate, barium titanate, and potassium titanate; tetraalkoxy titanium, such as tetraethoxy titanium, tetraisopropoxy titanium, and tetrabutyloxy titanium; and organic titanium compounds, such as tetraethylene glycol titanate, di-n-butyl bis(triethanolamine) titanate, di-isopropoxy titanium bis(acetylacetonate), isopropoxy titanium octanoate, isopropyl titanium trimethacrylate, isopropyl titanium triacrylate, isopropyl triisostearoyl titanate, isopropyl tridecylbenzenesulfonyl titanate, isopropyl tris(butylmethylpyrophosphate) titanate, tetraisopropyl di(dilaurylphosphite) titanate, dimethacryloxy acetate titanate, diacryloxy acetate titanate, di(dioctylphosphate)ethylene titanate, isopropoxy titanium tri(dioctylphosphate), isopropyl tris(dioctylpyrophosphate) titanate, tetraisopropyl bis(dioctylphosphite) titanate, tetraoctyl bis(ditridecylphosphite) titanate, tetra(2,2-diallyloxymethyl-1-butyl)bis(ditridecyl)phosphite titanate, bis(dioctylpyrophosphate) oxyacetate titanate, tris(dioctylpyrophosphate)ethylene titanate, isopropyltri-n-dodecylbenzene sulfonyl titanate, isopropyltrioctanoyl titanate, isopropyldimethacryloyl isostearoyl titanate, isopropylisostearoyldiacryl titanate, isopropyltri(dioctylphosphate) titanate, isopropyltricumylphenyl titanate, and isopropyltri(N-aminoethyl-aminoethyl) titanate.

Examples of the cobalt compound include inorganic cobalt compounds, such as cobalt salts of inorganic acids, cobalt halides, cobalt oxide, cobalt hydroxide, dicobalt octacarbonyl, cobalt hydrogen tetracarbonyl, tetracobalt dodecacarbonyl, and alkylidyne tricobalt nonacarbonyl; cobalt salts of organic acids (e.g., acetate, propionate, cyanides, naphthenate, and stearate; alkyl sulfonates (e.g., $C_{6-18}$ alkylsulfonates), such as methanesulfonate, ethanesulfonate, octanesulfonate, and dodecanesulfonate; aryl sulfonates that may be substituted with an alkyl group (e.g., $C_{6-18}$ alkyl-aryl sulfonates), such as benzenesulfonate, p-toluenesulfonate, naphthalene sulfonate, decylbenzene sulfonate, and dodecylbenzene sulfonate), such as cobalt tris(acetylacetate), and cobalt tris(acetylacetonate); and organic cobalt complexes. Examples of the ligand constituting a complex include hydroxy (OH), alkoxy (e.g., methoxy, ethoxy, propoxy, and butoxy), acyl (e.g., acetyl and propionyl), alkoxy carbonyl (e.g., methoxy carbonyl and ethoxy carbonyl), acetylacetonate, a cyclopentadienyl group, halogen atoms (e.g., chlorine and bromine), CO, CN, an oxygen atom, aquo ($H_2O$), phosphorus compounds such as phosphine (e.g., triaryl phosphines, such as triphenylphosphine), and nitrogen-containing compounds, such as ammine ($NH_3$), NO, nitro ($NO_2$), nitrato ($NO_3$), ethylenediamine, diethylenetriamine, pyridine, and phenanthroline.

Examples of the xenon compound include fluorides such as $XeF_2$, $XeF_4$, $XeF_6$, $XeOF_2$, $XeOF_4$, and $XeO_2F_4$, oxides such as $XeO_3$ and $XeO_4$, xenic acid $Xe(OH)_6$ and its salt $Ba_3XeO_6$, perxenic acid $H_4XeO_6$ and its salt $Na_4XeO_6$, complexes with metal carbonyl $M(CO)_5Xe$ (M=Cr, Mo, W), and hydrates.

Examples of the chromium compound include chromium acetylacetone complexes, such as acetylacetone chromium; chromium alkoxide, such as chromium(III) isopropoxide; organic acid chromium, such as chromium(II) acetate and chromium(III) acetate hydroxide; organic chromium compounds, such as tris(allyl) chromium, tris(methallyl) chromium, tris(crotyl) chromium, bis(cyclopentadienyl) chromium (i.e. chromocene), bis(pentamethylcyclopentadienyl) chromium (i.e. decamethylchromocene), bis(benzene) chromium, bis(ethylbenzene) chromium, bis(mesitylene) chromium, bis(pentadienyl) chromium, bis(2,4-dimethylpentadienyl) chromium, bis(allyl)tricarbonyl chromium, (cyclopentadienyl)(pentadienyl) chromium, tetra(1-norbornyl) chromium, (trimethylenemethane)tetracarbonyl chromium, bis(butadiene)dicarbonyl chromium, (butadiene)tetracarbonyl chromium, and bis(cyclooctatetraene) chromium.

Examples of the tungsten compound include inorganic tungsten compounds, such as tungsten trioxide, ammonium tungstate, and sodium tungstate; and organic tungsten compounds, such as tungsten complexes coordinated with boron atoms, such as one coordinated with ethylborylethylidene ligands; tungsten complexes coordinated with carbon atoms, such as one coordinated with carbonyl ligands, cyclopentadienyl ligands, alkyl group ligands, and olefin-based ligands; tungsten complexes coordinated with nitrogen atoms, such as one coordinated with pyridine ligands and acetonitrile ligands; tungsten complexes coordinated with phosphorus atoms, such as one coordinated with phosphine ligands and phosphite ligands; and tungsten complexes coordinated with sulfur atoms, such as one coordinated with diethyl carbamodithioato ligands.

Examples of the thallium compound include inorganic thallium compounds, such as thallium nitrate, thallium sulfate, thallium fluoride, thallium chloride, thallium bromide, and thallium iodide; organic thallium compounds, such as trialkyl thallium, such as trimethyl thallium, triethyl thallium, and triisobutyl thallium; aryl thallium, such as dialkyl thallium halide, alkenyl dialkyl thallium, alkynyl dialkyl thallium, triphenyl thallium, and tritolyl thallium; diaryl thallium halide, thallium 2-ethylhexanoate, thallium malonate, thallium formate, thallium ethoxide, and thallium acetylacetonate.

Examples of the zirconium compound include inorganic zirconium compounds, such as zirconium nitrate, zirconium sulfate, zirconium carbonate, zirconium hydroxide, zirconium fluoride, zirconium chloride, zirconium bromide, and zirconium iodide; and organic zirconium compounds, such as zirconium n-propoxide, zirconium n-butoxide, zirconium t-butoxide, zirconium isopropoxide, zirconium ethoxide, zirconium acetate, zirconium acetylacetonate, zirconium butoxyacetylacetonate, zirconium bisacetylacetonate, zirconium ethylacetoacetate, zirconium acetylacetonate bisethylacetoacetate, zirconium hexafluoroacetylacetonate, and zirconium trifluoroacetylacetonate.

Examples of the zinc compound include diethylzinc, dimethylzinc, zinc acetate, zinc nitrate, zinc stearate, zinc oleate, zinc palmitate, zinc myristate, zinc dodecanoate, zinc acetylacetonate, zinc chloride, zinc bromide, zinc iodide, and zinc carbamate.

Examples of the silver compound include organic silver compounds, such as silver acetate, silver pivalate, silver trifluoromethanesulfonate, and silver benzoate; and inorganic silver compounds, such as silver nitrate, silver fluoride, silver chloride, silver bromide, silver iodide, silver sulfate, silver oxide, silver sulfide, silver tetrafluoroborate, silver hexafluorophosphate ($AgPF_6$), and silver hexafluoroantimonate ($AgSbF_6$).

Examples of the aluminum compound include inorganic aluminum compounds, such as aluminum oxide; alkoxy compounds, such as trimethoxy aluminum, triethoxy aluminum, isopropoxy aluminum, isopropoxydiethoxy aluminum, and tributoxy aluminum; acyloxy compounds, such as triacetoxy aluminum, tristearate aluminum, and tributyrate aluminum; and organic aluminum compounds, such as aluminum isopropylate, aluminum sec-butylate, aluminum tert-butylate, aluminum tris(ethylacetoacetate), tris(hexafluoroacetylacetonate)aluminum, tris(ethylacetoacetate) aluminum, tris(n-propylacetoacetate)aluminum, tris(isopropylacetoacetate)aluminum, tris(n-butylacetoacetate) aluminum, tris(salicylaldehyde)aluminum, tris(2-ethoxycarbonylphenolate)aluminum, tris(acetylacetonate) aluminum, trialkyl aluminum compounds, such as trimethyl aluminum, triethyl aluminum, and triisobutyl aluminum, dialkyl aluminum halide, alkenyl dialkyl aluminum, alkynyl dialkyl aluminum, aryl aluminum such as triphenyl aluminum and tritolyl aluminum, and diaryl aluminum halides.

Examples of the vanadium compound include vanadic acid and metavanadic acid and inorganic vanadium compounds of alkali metal salts of these; alkoxides, such as triethoxyvanadyl, pentaethoxy vanadium, triamyloxyvanadyl, and triisopropoxyvanadyl; acetonates, such as bisacetylacetonate vanadyl, vanadium acetylacetonate, vanadyl acetylacetonate, and vanadium oxyacetylacetonate; and organic vanadium compounds, such as vanadium stearate, vanadium pivalate, and vanadium acetate.

Examples of the niobium compound include halides such as niobium(V) chloride and niobium(V) fluoride; inorganic niobium compounds, such as niobium sulfate, niobic acid, and niobate; and organic niobium compounds, such as niobium alkoxide.

Examples of the tantalum compound include inorganic tantalum compounds, such as $TaCl_5$ and $TaF_5$; and organic tantalum compounds, such as $Ta(OC_2H_5)_5$, $Ta(OCH_3)_5$, $Ta(OC_3H_7)_5$, $Ta(OC_4H_9)_5$, $(C_5H_5)_2TaH_3$, and $Ta(N(CH_3)_2)_5$.

Examples of the molybdenum compound include inorganic molybdenum compounds, such as molybdenum trioxide, zinc molybdate, ammonium molybdate, magnesium molybdate, calcium molybdate, barium molybdate, sodium molybdate, potassium molybdate, phosphomolybdic acid, ammonium phosphomolybdate, sodium phosphomolybdate, silicomolybdic acid, molybdenum disulfide, molybdenum diselenide, molybdenum ditelluride, molybdenum boride, molybdenum disilicide, molybdenum nitride, and molybdenum carbide; and organic molybdenum compounds, such as molybdenum dialkyldithiophosphate and molybdenum dialkyldithiocarbamate.

Examples of the manganese compound include inorganic manganese compounds, such as hydroxides, nitrates, acetates, sulfates, chlorides, and carbonates of manganese; and organic manganese compounds including manganese oxalate, acetylacetonate compounds, and a manganese alkoxide such as methoxide, ethoxide, or butoxide.

Examples of the iron compound include inorganic iron compounds, such as iron(II) fluoride, iron(III) fluoride, iron(II) chloride, iron(III) chloride, iron(II) bromide, iron (III) bromide, iron(II) iodide, iron(III) iodide, iron(II) oxide, iron(III) oxide, triiron(II, III) tetroxide, iron(II) sulfate, iron(III) sulfate, iron(II) nitrate, iron(III) nitrate, iron(II) hydroxide, iron(III) hydroxide, iron(II) perchlorate, iron(III) perchlorate, ammonium iron(II) sulfate, ammonium iron(III) sulfate, iron(III) tungstate oxide, iron(III) tetravanadate, iron(II) selenide, iron(II) titanium trioxide, diiron(III) titanium pentoxide, iron(II) sulfide, iron(III) sulfide, diiron(II) phosphide, triiron(II) phosphide, and iron(III) phosphide; and organic iron compounds, such as iron(II) acetate, iron (III) acetate, iron(II) formate, iron(III) triformate, iron(II) tartrate, sodium iron(III) tartrate, iron(II) lactate, iron(II) oxalate, iron(III) oxalate, ammonium iron(III) citrate, iron (III) laurate, iron(III) stearate, iron(III) tripalmitate, potassium hexacyanoferrate(II), potassium hexacyanoferrate(III), bis(2,4-pentanedionato)diaqua iron(II), tris(2,4-pentanedionato) iron(III), potassium tris(oxalato)ferrate (III), iron(III) tris(trifluoromethanesulfonate), iron(III) p-toluenesulfonate, iron(III) dimethyldithiocarbamate, iron(III) diethyldithiocarbamate, and ferrocene.

Examples of the copper compound include organic copper compounds, such as copper oxalate, copper stearate, copper formate, copper tartrate, copper oleate, copper acetate, copper gluconate, and copper salicylate; and inorganic copper compounds, such as copper carbonate, copper chloride, copper bromide, copper iodide, copper phosphate, and natural minerals such as hydrotalcite, stichtite, and pyrolite.

Examples of the cadmium compound include inorganic cadmium compounds, such as cadmium fluoride, cadmium chloride, cadmium bromide, cadmium iodide, cadmium oxide, and cadmium carbonate; and organic cadmium compounds such as cadmium phthalate and cadmium naphthalate.

Examples of the mercury compound include inorganic mercury compounds, such as mercury(II) chloride, mercury sulfate, and mercury(II) nitrate; and organic mercury compounds, such as methyl mercury, methylmercuric chloride, ethyl mercury, ethylmercuric chloride, phenylmercuric acetate, thimerosal, para-chloromercuribenzoate, and fluorescein mercuric acetate.

Examples of the gallium compound include organic gallium compounds, such as tetraphenyl gallium and tetrakis (3,4,5-trifluorophenyl) gallium; and inorganic gallium compounds, such as gallium oxoate, gallium halides, gallium hydroxide, and gallium cyanide.

Examples of the indium compound include organic indium compounds, such as triethoxyindium, indium 2-ethylhexanoate, and indium acetylacetonate; and inorganic indium compounds, such as indium cyanide, indium nitrate, indium sulfate, indium carbonate, indium fluoride, indium chloride, indium bromide, and indium iodide.

Examples of the arsenic compound include inorganic arsenic compounds, such as diarsenic trioxide, diarsenic pentoxide, arsenic trichloride, arsenic pentoxide, and arsenious acid and arsenic acid and salts thereof, including sodium arsenite, ammonium arsenite, potassium arsenite, ammonium arsenate, and potassium arsenate; and organic arsenic compounds, such as cacodylic acid, phenylarsonic acid, diphenylarsonic acid, p-hydroxyphenylarsonic acid, p-aminophenylarsonic acid, and salts thereof, including sodium cacodylate and potassium cacodylate.

Examples of the antimony compound include inorganic antimony compounds, such as antimony oxide, antimony phosphate, $KSb(OH)$, and $NH_4SbF_6$; and organic antimony compounds, such as antimony esters of organic acids, cyclic alkyl antimonite, and triphenylantimony.

Examples of the bismuth compound include organic bismuth compounds, such as triphenyl bismuth, bismuth 2-ethylhexanoate, and bismuth acetylacetonate; and inorganic bismuth compounds, such as bismuth nitrate, bismuth sulfate, bismuth acetate, bismuth hydroxide, bismuth fluoride, bismuth chloride, bismuth bromide, and bismuth iodide.

Examples of the selenium compound include organic selenium compounds, such as selenomethionine, selenocysteine, and selenocystine; and inorganic selenium compounds, such as alkali metal selenates such as potassium selenate, and alkali metal selenites such as sodium selenite.

Examples of the tellurium compound include telluric acid and salts thereof, tellurium oxide, tellurium chloride, tellurium bromide, tellurium iodide, and tellurium alkoxide.

Examples of the magnesium compound include organic magnesium compounds, such as ethyl acetoacetate magnesium monoisopropylate, magnesium bis(ethylacetoacetate), alkylacetoacetate magnesium monoisopropylate, and magnesium bis(acetylacetonate); and inorganic magnesium compounds, such as magnesium oxide, magnesium sulfate, magnesium nitrate, and magnesium chloride.

Examples of the calcium compound include organic calcium compounds, such as calcium 2-ethylhexanoate, calcium ethoxide, calcium methoxide, calcium methoxyethoxide, and calcium acetylacetonate; and inorganic calcium compounds, such as calcium nitrate, calcium sulfate, calcium carbonate, calcium phosphate, calcium hydroxide, calcium cyanide, calcium fluoride, calcium chloride, calcium bromide, and calcium iodide.

As the compound in which the element to be used for doping of nanodiamonds is Li, Na, K, Cs, S, Sr, Ba, F, Y, or lanthanoids, a known organic or inorganic compound can be used.

The proportion of the explosive in the composition containing the explosive and the Group 14 element compound and, as necessary, the third element compound is preferably from 80 to 99.9999 mass %, more preferably from 85 to 99.999 mass %, even more preferably from 90 to 99.99 mass %, and particularly preferably from 95 to 99.9 mass %. The proportion of the Group 14 element compound is preferably from 0.0001 to 20 mass %, more preferably from 0.001 to 15 mass %, even more preferably from 0.01 to 10 mass %, and particularly preferably from 0.1 to 5 mass %. The proportion of the third element compound is preferably from 0 to 20 mass %, more preferably from 0.001 to 15 mass %, even more preferably from 0.01 to 10 mass %, and particularly preferably from 0.02 to 8 mass %. Furthermore, the Group 14 element content in the mixture containing the explosive and the Group 14 element compound and, as necessary, the third element is preferably from 0.000005 to 10 mass %, more preferably from 0.00001 to 8 mass %, even more preferably from 0.0001 to 5 mass %, particularly preferably from 0.001 to 3 mass %, and most preferably from 0.01 to 1 mass %, and the third element content is preferably from 0 to 10 mass %, more preferably from 0.00001 to 8 mass %, even more preferably from 0.00002 to 5 mass %, particularly preferably from 0.00003 to 3 mass %, and most preferably from 0.00004 to 2 mass %.

The preferred doped nanodiamonds obtained by the production method according to an embodiment of the present invention contain preferably from 0.001 to 100 mol, more preferably from 0.002 to 10 mol, and even more preferably from 0.003 to 5 mol, of the third element relative to 1 mol of the Group 14 element.

Mixing of the explosive and the Group 14 element compound and, as necessary, the third element compound may be performed by powder mixing in the case where these are solids, by melting, or by mixing through dissolving or dispersing these in an appropriate solvent. The mixing can be also performed by agitation, bead milling, or ultrasonic waves.

In one preferred embodiment, the explosive composition containing the explosive and the Group 14 element compound and, as necessary, the third element compound further contains a cooling medium. The cooling medium may be solid, liquid, or gas. Examples of the method of using the cooling medium include a method of detonating the mixture of the explosive and the Group 14 element compound and, as necessary, the third element compound in the cooling medium. Examples of the cooling medium include inert gases (nitrogen, argon, CO), water, ice, liquid nitrogen, aqueous solutions of Group 14 element-containing salts, crystalline hydrates, aqueous solutions of third element-containing salts, and crystalline hydrates. Examples of the Group 14 element-containing salt include ammonium hexafluorosilicate, ammonium silicate, and tetramethylammonium silicate. The cooling medium is preferably used in an amount approximately 5 times the weight of the explosive, for example, in the case of water or ice.

In one preferred embodiment of the present invention, the explosive composition containing the explosive and the Group 14 element compound and, as necessary, the third element compound is transformed into diamonds through compression by shock wave under high pressure and high temperature conditions generated by explosion of the explosive (detonation method). At the time of explosion of the explosive, at least one Group 14 element and, as necessary, at least one the third element are incorporated into the diamond lattice. The carbon source of the nanodiamonds can be the explosive and the organic Group 14 element compound and, as necessary, the third element compound; however, in the case where the mixture containing the explosive and the Group 14 element compound and, as necessary, the third element compound further contains a carbon material that contains no Group 14 element and no third element, this carbon material may be the carbon source of the nanodiamonds.

In the production method and the purification method according to embodiments of the present invention, the purification of the nanodiamond composition doped with the Group 14 element and, as necessary, the third element, which contains the elemental Group 14 element and/or its oxide and, as necessary, the elemental third element and/or its oxide, includes alkali treatment and may be performed by combining the alkali treatment and the mixed acid treatment. The preferred purification is a combination of the alkali treatment and the mixed acid treatment (the order is not specified).

Examples of the mixed acid include a mixed acid of concentrated sulfuric acid and concentrated nitric acid, and the mixed acid is preferably a mixed acid of concentrated sulfuric acid:concentrated nitric acid=1:1 (volume ratio). The temperature for the mixed acid treatment is from 50 to 200° C., and the duration of the mixed acid treatment is from 0.5 to 24 hours.

Examples of the alkali include alkali metal hydroxides, such as sodium hydroxide and potassium hydroxide. Examples of the alkali metal hydroxide include a 0.1 to 10 N alkali metal hydroxide aqueous solution. The temperature of the alkali treatment is from 30 to 150° C., and the duration of the alkali treatment is from 0.5 to 24 hours.

When the explosive composition containing the explosive and the Group 14 element compound and, as necessary, the third element is exploded in a container, in addition to the doped nanodiamonds, for example, graphite, metal impurities, elemental Group 14 element (elemental Si, elemental Ge, elemental Sn, elemental Pb), Group 14 element oxides ($SiO_2$, $GeO_2$, $SnO_2$, $PbO_2$), elemental third element, and third element oxides are formed. The graphite, metal impurities, elemental third element, and third element oxides can be removed by the mixed acid treatment, and the elemental Group 14 element and Group 14 element oxides can be removed by the alkali treatment.

The nanodiamonds doped with the Group 14 element and, as necessary, the third element of a preferred embodiment obtained by the production method or the purification method according to an embodiment of the present invention have a fluorescence emission peak in a range of 720 to 770 nm and satisfies requirement (i) and/or (ii):

(i) BET specific surface area of 20 to 900 $m^2/g$; and
(ii) the average size of the primary particles of 2 to 70 nm.

The doped nanodiamonds obtained by the production method or the purification method according to a preferred embodiment of the present invention have a Group 14 element-vacancy (V) center and, as necessary, further have a third element-V center and, thereby, have a fluorescence emission peak. In the case where the Group 14 element is Si, the wavelength of the fluorescence emission peak is preferably from 720 to 770 nm, and more preferably from 730 to 760 nm, in the case where the Group 14 element contains silicon; is preferably from 580 to 630 nm, and more preferably from 590 to 620 nm, in the case where the Group 14 element contains germanium; is preferably from 590 to 650 nm, and more preferably from 600 to 640 nm, in the case where the Group 14 element contains tin; and is preferably from 540 to 600 nm, and more preferably from 550 to 590 nm, in the case where the Group 14 element contains lead. In one preferred embodiment of the present invention, the fluorescence emission peak of the nanodiamonds in which the Group 14 element is Si has a sharp peak of approximately 738 nm, which is called zero phonon level (ZPL).

The concentration of the Group 14 element-V center of the nanodiamonds doped with the Group 14 element and, as necessary, the third element obtained by the production method or the purification method according to an embodiment of the present invention is preferably $1\times10^{10}/cm^3$ or greater, and more preferably from $2\times10^{10}$ to $1\times10^{19}/cm^3$, and the concentration of the third element-V center is preferably $1\times10^{10}/cm^3$ or greater, and more preferably from $2\times10^{10}$ to $1\times10^{19}/cm^3$ or greater. It is presumed that the concentrations of the Group 14 element-V center and the third element-V center can be determined by using, for example, a confocal laser microscope or a fluorescence and absorbance spectrometer. Note that, for determination of the concentration of M-V center (M is the Group 14 element or the third element) by fluorescence and absorbance spectrometry, Literature (DOI 10.1002/pssa.201532174) can be used as a reference.

The BET specific surface area of the nanodiamonds doped with the Group 14 element and, as necessary, the third element obtained by the production method or the purification method according to an embodiment of the present invention is preferably from 20 to 900 $m^2/g$, more preferably from 25 to 800 $m^2/g$, even more preferably from 30 to 700 $m^2/g$, and particularly preferably from 35 to 600 $m^2/g$. The BET specific surface area can be measured by nitrogen adsorption. Examples of a measurement instrument for the BET specific surface area include BELSORP-mini II (available from Microtrac BEL) and, for example, the BET specific surface area can be measured under the following conditions.

Measured powder amount: 40 mg
Preliminary drying: treated at 120° C. for 3 hours in a vacuum.
Measurement temperature: −196° C. (liquid nitrogen temperature)

The average size of the primary particles of the doped nanodiamonds obtained by the production method or the purification method according to an embodiment of the present invention is preferably from 2 to 70 nm, more preferably from 2.5 to 60 nm, even more preferably from 3 to 55 nm, and particularly preferably from 3.5 to 50 nm. The average size of the primary particles can be determined by Scherrer equation based on the analysis result of the powder X-ray diffractometry (XRD). Examples of a measurement instrument of XRD include the Multipurpose X-ray Diffraction System with Built-in Intelligent Guidance (available from Rigaku Corporation).

The carbon content of the doped nanodiamonds obtained by the production method or the purification method according to an embodiment of the present invention is preferably from 70 to 99 mass %, more preferably from 75 to 98 mass %, and even more preferably from 80 to 97 mass %.

The hydrogen content of the doped nanodiamonds obtained by the production method or the purification method according to an embodiment of the present invention is preferably from 0.1 to 5 mass %, more preferably from 0.2 to 4.5 mass %, and even more preferably from 0.3 to 4.0 mass %.

The nitrogen content of the doped nanodiamonds obtained by the production method or the purification method according to an embodiment of the present invention is preferably from 0.1 to 5 mass %, more preferably from 0.2 to 4.5 mass %, and even more preferably from 0.3 to 4.0 mass %.

The contents of carbon, hydrogen, and nitrogen of the doped nanodiamond obtained by the production method or the purification method according to an embodiment of the present invention can be measured by elementary analysis.

The Group 14 element content of the doped nanodiamonds obtained by the production method or the purification method according to an embodiment of the present invention is preferably from 0.0001 to 10.0 mass %, more preferably from 0.0001 to 5.0 mass %, and even more preferably from 0.0001 to 1.0 mass %, and the third element content is preferably from 0.0001 to 10.0 mass %, more preferably from 0.0001 to 5.0 mass %, and even more preferably from 0.0001 to 1.0 mass %. The Group 14 element content and the third element content can be measured by, for example, inductively-coupled plasma emission spectrometry (ICP-AES, XRF, secondary ion mass spectrometry (SIMS)), and after alkali fusion, the doped nanodiamonds can be quantified as an acidic solution.

For the doped nanodiamonds obtained by the production method or the purification method according to a preferred embodiment of the present invention, characteristic peaks of diamond, graphite, a surface hydroxy group (OH), and a surface carbonyl group (CO) can be identified in a chart of Raman shift obtained by Raman spectroscopy. The characteristic peak of diamond in a Raman shift chart is at 1100 to 1400 $cm^{-1}$, the characteristic peak of graphite is at 1450 to 1700 $cm^{-1}$, the characteristic peak of a surface hydroxy group (OH) is at 1500 to 1750 $cm^{-1}$, and the characteristic peak of a surface carbonyl group (CO) is at 1650 to 1800 $cm^{-1}$. The areas of characteristic peaks of diamond, graphite, a surface hydroxy group (OH), and a surface carbonyl group (CO) can be determined by Raman spectrometer. The laser wavelength of the Raman light source is, for example, from 325 nm or 488 nm. As the Raman spectrometer, a confocal microscopic Raman spectrometer (e.g., trade name: Confocal Raman Microscope LabRAM HR Evolution, available from Horiba, Ltd.) can be used.

In the doped nanodiamonds of a preferred embodiment obtained by the production method or the purification method according to an embodiment of the present invention, the ratio (D/G) of the peak area (D) of diamond to the peak area (G) of graphite is preferably from 0.2 to 9, more preferably from 0.3 to 8, and even more preferably from 0.5 to 7.

In the doped nanodiamonds of a preferred embodiment obtained by the production method or the purification method according to an embodiment of the present invention, the ratio (H/D) of the peak area (H) of a surface hydroxy group (OH) to the peak area (D) of diamond is preferably from 0.1 to 5, more preferably from 0.1 to 4.0, and even more preferably from 0.1 to 3.0.

In the doped nanodiamonds of a preferred embodiment obtained by the production method or the purification method according to an embodiment of the present invention, the ratio (C/D) of the peak area (C) of surface carbonyl group (CO) to the peak area (D) of diamond is preferably from 0.01 to 1.5, more preferably from 0.03 to 1.2, and even more preferably from 0.05 to 1.0.

As the Raman spectroscopy method for the nanodiamonds, Literature (e.g., Vadym N. Mochalin et al., NATURE NANOTECHNOLOGY, 7 (2012) 11-23, especially FIG. 3) can be used as a reference.

In another preferred embodiment of the present invention, the surface of the doped nanodiamonds obtained by the production method or the purification method according to an embodiment of the present invention may have at least one oxygen functional group terminal and/or at least one hydrogen terminal. Examples of the oxygen functional group terminal include OH, COOH, $CONH_2$, C=O, and CHO, and OH, C=O, and COOH are preferred. Examples of the hydrogen terminal include alkyl groups having from 1 to 20 carbons.

Presence of at least one the oxygen functional group terminals on the surfaces of the doped nanodiamonds is preferred because aggregation of the nanodiamond particles can be suppressed. Presence of at least one the hydrogen terminals on the surfaces of the doped nanodiamonds is preferred because the zeta potential is positive, and stable and high dispersion occurs in an acidic aqueous solution.

In another preferred embodiment of the present invention, the doped nanodiamonds obtained by the production method or the purification method according to an embodiment of the present invention may have a core-shell structure. The core of the doped nanodiamonds having a core-shell structure is the nanodiamond particle doped with the Group 14 element and, as necessary, the third element. This core is preferably one having the Group 14 element-V center and, as necessary, further having the third element-V center, and emitting fluorescence. The shell is a non-diamond cover layer, may contain a sp2 carbon, and preferably further contains an oxygen atom. The shell may be a graphite layer. The thickness of the shell is preferably 5 nm or less, more preferably 3 nm or less, and even more preferably 1 nm or less. The shell may have a hydrophilic functional group on its surface.

Preferably, the doped nanodiamonds can be produced by detonation. The shape of the doped nanodiamonds is preferably spherical, ellipsoidal, or polyhedral close to these.

The degree of circularity is a numerical value to represent the complexity of a shape illustrated in, for example, an image. For the degree of circularity, the numerical value becomes smaller as the shape is more complex, while the maximum value thereof is 1. The degree of circularity can be determined by, for example, analyzing a TEM image of the doped nanodiamond by an image analysis software (e.g., winROOF) and employing the following equation.

$$\text{Degree of circularity}=4\pi\times(\text{area})\div(\text{circumference})^2$$

For example, in the case of a perfect circle having a radius of 10, the calculation equation becomes "$4\pi\times(10\times10\times\pi)\div(10\times2\times\pi)^2$", and the degree of circularity results in 1 (maximum value). That is, in terms of the degree of circularity, the perfect circle is a shape that is the least complex. The degree of circularity of the doped nanodiamond is preferably 0.2 or greater, more preferably 0.3 or greater, and even more preferably 0.35 or greater.

In one preferred embodiment of the present invention, the center of the doped nanodiamond particle has a diamond structure including an sp3 carbon and the doped Group 14 element and, as necessary, the third element, and the surface thereof is covered with an amorphous layer formed from sp2 carbons. In a more preferred embodiment, the outer side of the amorphous layer may be covered with a graphite oxide layer. Furthermore, a hydration layer may be formed between the amorphous layer and the graphite oxide layer.

In one preferred embodiment of the present invention, the doped nanodiamonds obtained by the production method or the purification method according to an embodiment of the present invention have a positive or negative zeta potential. The zeta potential of the doped nanodiamond is preferably from −70 to 70 mV, and more preferably from −60 to 30 mV.

The doped nanodiamonds can be produced by a production method including mixing of an explosive composition containing an explosive and a Group 14 element compound and, as necessary, a third element compound and exploding the obtained mixture in a sealed container. Examples of the container include metal containers and synthetic resin containers. The explosive composition containing the explosive and the Group 14 element compound and, as necessary, the third element compound is preferably formed by pressing or casting. Examples of the method of producing particles (dry powder) of each of the explosive, the Group 14 element compound, and the third element compound include crystallization, crushing, and spray flash evaporation. When the explosive composition is formed by pressing or casting, the explosive and the Group 14 element compound and, as necessary, the third element compound are mixed as dry powder, as molten state, or by using a solvent. The state at the time of mixing the explosive and the Group 14 element compound may be any of the following four combinations:

Explosive (dry powder) and Group 14 element compound (dry powder)

Explosive (dry powder) and Group 14 element compound (molten state)

Explosive (molten state) and Group 14 element compound (dry powder)

Explosive (molten state) and Group 14 element compound (molten state)

In the case where the explosive composition is formed by further mixing the third element compound, the third element compound may be dry powder or in a molten state, and eight possible combinations of dry powder and molten state exist for mixing the explosive, the Group 14 element compound, and the third element compound.

Mixing of the explosive and the Group 14 element compound and, as necessary, the third element compound may be performed in the presence or absence of a solvent, and forming can be performed by pressing or casting after the mixing.

The average particle diameters of the explosive, the Group 14 element compound, and the third element compound are preferably 10 mm or less, more preferably 5 mm or less, and even more preferably 1 mm or less. Note that these average particle diameters can be measured by laser diffraction/scattering methods, by an optical microscope, or by Raman method.

The product obtained by explosion is further subjected to an alkali treatment and, as necessary, can be further subjected to purification including a mixed acid treatment, and a post treatment.

The post treatment can include annealing and gas-phase oxidation. The Group 14 element and, as necessary, the third element incorporated in the doped nanodiamond are brought into contact with vacancy due to the annealing treatment, and thus the Group 14 element-V center and, as necessary, the third element-V center can be formed. Furthermore, by the gas-phase oxidation, the graphite layer formed on the surface of the doped nanodiamond can be made thin or removed. Vacancy formation may be performed before the annealing although such vacancy formation is an optional process. The vacancy formation is performed by irradiation with an ion beam or an electron beam. Even in the case where no vacancy formation is performed, the Group 14 element-V center and, as necessary, the third element-V center are formed by the annealing; however, by performing the annealing after the vacancy formation, more Group 14 element-V center and, as necessary, third element-V center can be formed. For the density of vacancies to be introduced by ion beam irradiation or electron beam irradiation, the upper limit is limited by a concentration at which the diamond is broken (a vacancy concentration of $>1\times10^{21}/\text{cm}^3$), but the lower limit is, for example, $1\times10^{16}/\text{cm}^3$ or higher, or even $1\times10^{18}/\text{cm}^3$ or higher. The ion beam is preferably an ion beam of hydrogen (H) or helium (He). For example, the energy of the ion beam of hydrogen is preferably from 10 to 1500 keV, and the energy of the ion beam of helium is preferably from 20 to 2000 keV. The energy of the electron beam is preferably from 500 to 5000 keV.

The temperature of the annealing is preferably 800° C. or higher, and the annealing time is 30 minutes or longer.

The gas-phase oxidation can be performed in an air atmosphere, the gas-phase oxidation temperature is preferably 300° C. or higher, and the gas-phase oxidation time is 2 hours or longer.

EXAMPLES

Hereinafter, the present invention will be described more specifically with reference to examples, but the present invention is not limited by these examples.

Examples 1 to 6

Using TNT as the explosive and using, as the Group 14 element compound, the dopant shown in Table 1 in the number of moles shown in Table 1 relative to 1 mol of TNT, production of silicon-doped nanodiamonds was performed by detonation in accordance with an ordinary method under conditions including the temperature (K) and the pressure (GPa) shown in Table 1, and thereby the nanodiamonds doped with silicon in a proportion shown in Table 1 can be obtained.

The names and structural formulas of the dopant molecules (silicon compounds) 1 to 6 used for doping with silicon are shown below.

Dopant molecule 1: Siline

Dopant molecule 2: Tetramethylsilane (SiMe$_4$)

Dopant molecule 3: Tetrakis(nitratemethyl)silane (SiPETN)

Dopant molecule 4: Tetrakis(dimethylsilanolyl)silane (Si(SiMe$_2$OH)$_4$)

Dopant molecule 5: Tetrakis(trimethylsilyl)silane (Si(SiMe$_3$)$_4$)

Dopant molecule 6: Tetrakis(trimethylsilyl)methane (C(SiMe$_3$)$_4$)

[Chem. 1]

TABLE 1

| Examples | Dopant molecule | Proportion of dopant molecule used in TNT288 molecule | TEMPERATURE [K] | Pressure [GPa] | (Si atom/ C atom) × 100 (%) |
| --- | --- | --- | --- | --- | --- |
| 1 | Siline | 56/288 = 0.19 | 3521 | 33 | 3.2 |
| 2 | SiMe$_4$ | 60/288 = 0.21 | 3525 | 34 | 2.3 |
| 3 | SiPETN | 48/288 = 0.17 | 3508 | 29 | 3.1 |
| 4 | Si(SiMe$_2$OH)$_4$ | 60/288 = 0.21 | 3528 | 33 | 32.3 |
| 5 | Si(SiMe$_3$)$_4$ | 60/288 = 0.21 | 3518 | 31 | 36.0 |
| 6 | C(SiMe$_3$)$_4$ | 60/288 = 0.21 | 3518 | 30 | 22.7 |

As is clear from Table 1, it is apparent that nanodiamonds to which a large amount of silicon atoms have been introduced can be obtained according to embodiments of the present invention.

Example 7

Using approximately 60 g of an explosive composition each obtained by adding 10 parts by mass, 1 part by mass, or 0.1 parts by mass of triphenylsilanol as a silicon compound into 100 parts by mass of explosive containing trinitrotoluene (TNT) and cyclotrimethylene trinitramine (RDX), silicon-doped nanodiamonds were produced in accordance with an ordinary method of nanodiamond production. For the obtained silicon-doped nanodiamonds, the following treatments were performed. Note that the added amount of triphenylsilanol in the explosive was 10 mass %, 1 mass %, or 0.1 mass %.

(i) Mixed Acid Treatment

In 2800 g of a mixed acid of concentrated sulfuric acid:concentrated nitric acid=11:1 (weight ratio), 15 g of the nanodiamonds obtained by the detonation test was added and treated at 150° C. for 10 hours while being agitated.

(ii) Alkali Treatment

In 100 mL of an 8 N sodium hydroxide aqueous solution, 1 g of the nanodiamonds that had been treated with the mixed acid was added and treated at 100° C. for 10 hours while being agitated.

(iii) Annealing

The nanodiamonds after the alkali treatment were annealed at 800° C. in a vacuum atmosphere for 30 minutes.

(iv) Gas-Phase Oxidation

The nanodiamonds that had been annealed was subjected to a gas-phase oxidation treatment at 300° C. in an air atmosphere for 2 hours, and thus the silicon-doped nanodiamonds according to an embodiment of the present invention were obtained.

(v) Fluorescence Analysis

Figure 1:
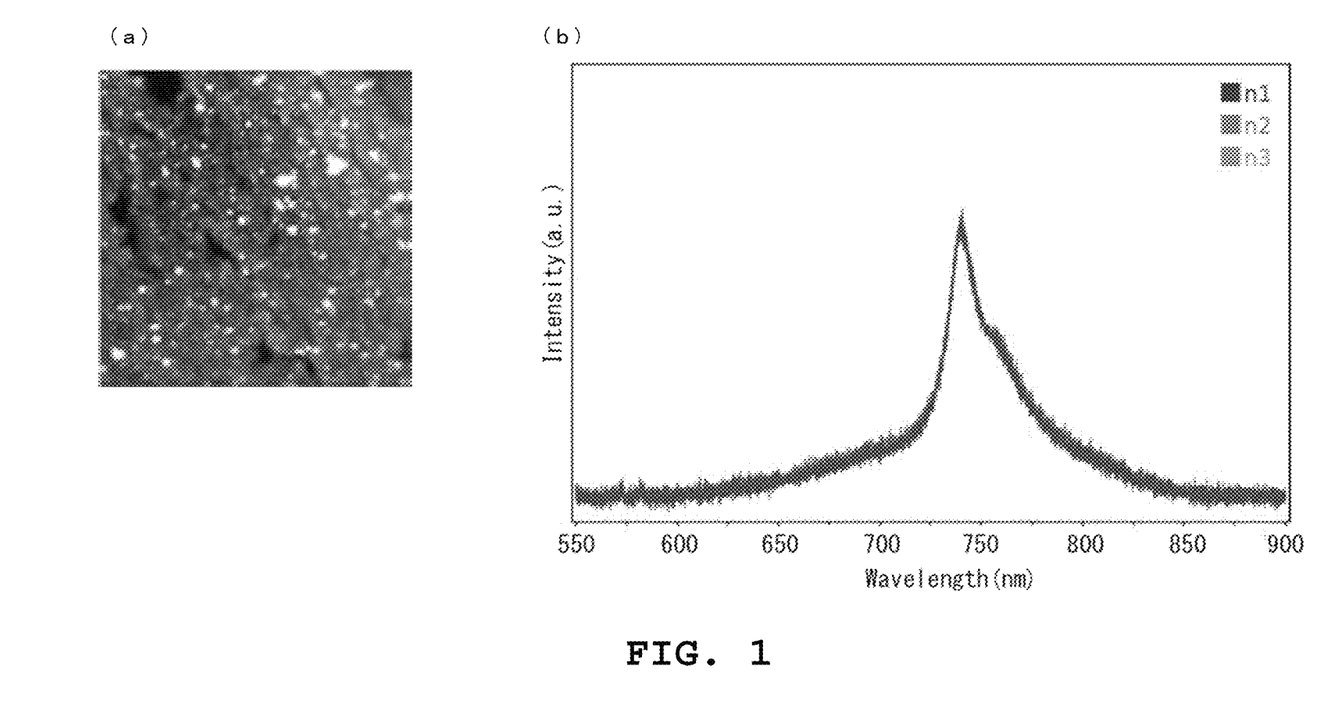
FIG. 1(a) is a brightness images at 738 nm of silicon-doped nanodiamonds obtained by using triphenylsilanol as a silicon compound in an addition amount, in terms of an external proportion, of 1 mass %.
In FIG. 1(b), a sideband (shoulder peak) of fluorescence is present around 750 nm; however, this sideband might not be present depending on the sample.

An aqueous suspension of 10 w/v % of the silicon-doped nanodiamonds according to an embodiment of the present invention obtained by the gas-phase oxidation was added dropwise on a glass substrate and dried, and thus an evaluation sample was prepared. The obtained evaluation sample was subjected to high-speed mapping using a confocal microscopic Raman spectrometer (trade name: Confocal Raman Microscope LabRAM HR Evolution, available from Horiba, Ltd.), and brightness imaging at 738 nm was performed. FIG. 1(a) shows the brightness images at 738 nm of the silicon-doped nanodiamonds obtained using triphenylsilanol as the silicon compound in an addition amount, in terms of an external proportion, of 1 mass %. FIG. 1(b) shows a fluorescence spectrum of brightness of FIG. 1(a). The zero phonon line (fluorescence peak) of the Si—V center can be confirmed. The Si content of the obtained silicon-doped nanodiamonds was 3.2 mass % when the added amount of triphenylsilanol in the explosive was 10 mass %, 0.15 mass % when the added amount was 1 mass %, and 0.03 mass % when the added amount was 0.1 mass %.

In FIG. 1(b), it was confirmed that the silicon-doped nanodiamonds according to an embodiment of the present invention have a fluorescence at 738 nm derived from the SV center. Furthermore, the average size of the primary particles measured by XRD and the BET specific surface area of the obtained silicon-doped nanodiamonds are shown in Table 2 below.

TABLE 2

| Added amount of triphenylsilanol in explosive | BET specific surface area (m²/g) | Average size of primary particles (nm) |
| --- | --- | --- |
| 10 mass % | 213 | 7.9 |
| 1 mass % | 232 | 7.2 |
| 0.1 mass % | 254 | 6.9 |

Measurement of BET Specific Surface Area
- Instrument: BELSORP-mini II (available from Microtrac BEL)
- Measured powder amount: 40 mg
- Preliminary drying: treated at 120° C. for 3 hours in a vacuum
- Measurement temperature: −196° C. (liquid nitrogen temperature)

Measurement of Average Size of Primary Particles (Powder X-Ray Diffractometry (XRD))
- Instrument: Multipurpose X-ray Diffraction System with Built-in Intelligent Guidance (available from Rigaku Corporation)

Figure 2:
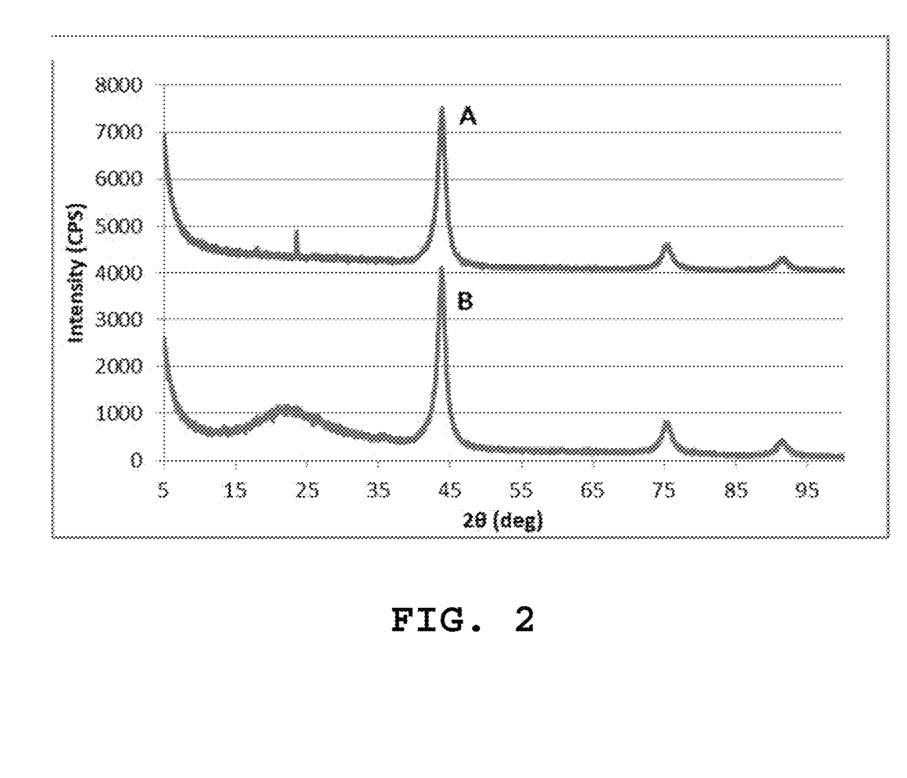
FIG. 2 is an XRD measurement result before and after alkali treatment. A: After alkali treatment B: Before alkali treatment

Measurement Method of Si Introduction Amount (XRF)
- Instrument: X-ray Fluorescence Spectrometer ZSX Primus IV, available from Rigaku Corporation The XRF measurement results before and after the alkali treatment are shown in Table 3, and the XRD measurement results before and after the alkali treatment are shown in FIG. 2.

TABLE 3

| Sample | Before treatment | After treatment |
| --- | --- | --- |
| Mg | — | 0.02 |
| Al | 0.05 | 0.008 |
| Si | 6.3 | 0.15 |
| P | 0.002 | 0.0005 |
| S | 0.24 | 0.08 |
| Cl | 0.03 | 0.02 |
| K | 0.02 | 0.002 |
| Ca | 0.13 | 0.13 |
| Ti | 0.04 | 0.04 |
| Cr | 0.02 | 0.010 |
| Fe | 0.08 | 0.050 |
| Ni | 0.003 | 0.002 |
| Cu | 0.02 | 0.009 |
| Zn | 0.01 | — |

* mass %

In Table 3, the amount of Si after the alkali treatment measured by XRF was significantly reduced compared to the amount before the alkali treatment, and thus the alkali treatment is effective for Si removal.

In FIG. 2:
- A broad peak originated from an amorphous compound was present around 23°.
- Based on the XRF measurement results, other than the diamond, the Si amount was the largest, and thus it is conceived that this peak was originated from the Si compound.
- Since the broad peak around 23° disappeared in the graph after the alkali treatment, it is conceived that the Si compound was removed by the alkali treatment.

Example 8

Nanodiamonds doped with silicon and boron can be obtained in the same manner as in Example 7 except for using 0.5 parts by mass of triphenylsilanol and 0.5 parts by mass of phenylboronic acid in place of 1 part by mass of triphenylsilanol of Example 7.

Example 9

Nanodiamonds doped with silicon and phosphorus can be obtained in the same manner as in Example 7 except for using 0.5 parts by mass of triphenylsilanol and 0.5 parts by mass of triphenylphosphine in place of 1 part by mass of triphenylsilanol of Example 7.

The invention claimed is:

1. A method for producing a nanodiamond doped with a Group 14 element selected from the group consisting of Si, Ge, Sn, and Pb, the method comprising:
    subjecting a nanodiamond composition to an alkali treatment to remove the Group 14 element and/or oxide thereof, wherein the nanodiamond composition comprises a nanodiamond doped with the Group 14 element, a Group 14 element and/or an oxide thereof,
    a ratio (H/D) of a peak area (H) of a surface hydroxy group (OH) to a peak area (D) of diamond by Raman spectroscopy is from 0.1 to 5, and
    a ratio (C/D) of a peak area (C) of a surface carbonyl group (CO) to a peak area (D) of diamond by Raman spectroscopy is from 0.01 to 1.

2. The method for producing a nanodiamond doped with a Group 14 element according to claim 1, further including treating the nanodiamond doped with the Group 14 element with a mixed acid of concentrated nitric acid and concentrated sulfuric acid before or after the alkali treatment.

3. The method for producing a nanodiamond doped with a Group 14 element according to claim 1,
wherein the nanodiamond composition further comprises at least one of another element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids and/or an oxide thereof.

4. A method for purifying a nanodiamond doped with a Group 14 element selected from the group consisting of Si, Ge, Sn, and Pb, the method comprising:
subjecting a nanodiamond composition thereof wherein the nanodiamond composition comprises a nanodiamond doped with the Group 14 element, a Group 14 element and/or an oxide thereof;
wherein the Group 14 element and/or oxide thereof are removed from the nanodiamond composition by the alkali treatment;
a ratio (H/D) of a peak area (H) of a surface hydroxy group (OH) to a peak area (D) of diamond by Raman spectroscopy is from 0.1 to 5, and
a ratio (C/D) of a peak area (C) of a surface carbonyl group (CO) to a peak area (D) of diamond by Raman spectroscopy is from 0.01 to 1.5.

5. The method for purifying a nanodiamond doped with a Group 14 element according to claim 4, wherein the nanodiamond composition is obtained by mixed acid treatment.

6. The method for purifying a nanodiamond doped with a Group 14 element according to claim 4, wherein the nanodiamond composition further comprises at least one of another element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids, and/or an oxide thereof.

7. The method for purifying a nanodiamond doped with a Group 14 element according to claim 4, wherein the nanodiamond is further doped with at least one of another element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids.

8. The method for producing a nanodiamond doped with a Group 14 element according to claim 1, wherein the nanodiamond is further doped with at least one of another element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids.

9. The method for producing a nanodiamond doped with a Group 14 element according to claim 1, wherein the nanodiamond composition is prepared by exploding an explosive composition containing at least one explosive and at least one Group 14 element compound in a sealed container.

10. The method for producing a nanodiamond doped with a Group 14 element according to claim 1, wherein the explosive composition further comprises a compound comprising at least one of another element selected from the group consisting of B, P, S, Cr, Al, Li, Na, K, Cs, Mg, Ca, Sr, Ba, Ti, Zr, V, Nb, Ta, Mo, W, Mn, Fe, Ni, Cu, Ag, Zn, Cd, Hg, Ga, In, Tl, As, Sb, Bi, Se, Te, Co, Xe, F, Y, and lanthanoids.

11. The method for producing a nanodiamond doped with a Group 14 element according to claim 1, wherein the nanodiamond has a Group 14 element-vacancy center, and
the nanodiamond has a fluorescence emission peak resulting from the Group 14 element-vacancy center.

12. The method for producing a nanodiamond doped with a Group 14 element according to claim 1, wherein the nanodiamond has a Group 14 element-vacancy center, and
a concentration of the Group 14 element-V center of the nanodiamonds doped with the at least one Group 14 element is $1 \times 10^{10}/cm^3$ or greater.

13. The method for purifying a nanodiamond doped with a Group 14 element according to claim 4, wherein the nanodiamond has a Group 14 element-vacancy center, and
the nanodiamond has a fluorescence emission peak resulting from the Group 14 element-vacancy center.

14. The method for purifying a nanodiamond according to claim 4, wherein the nanodiamond has a Group 14 element-vacancy center, and
a concentration of the Group 14 element-V center of the nanodiamonds doped with the at least one Group 14 element is $1 \times 10^{10}/cm^3$ or greater.

* * * * *